UNITED STATES PATENT OFFICE.

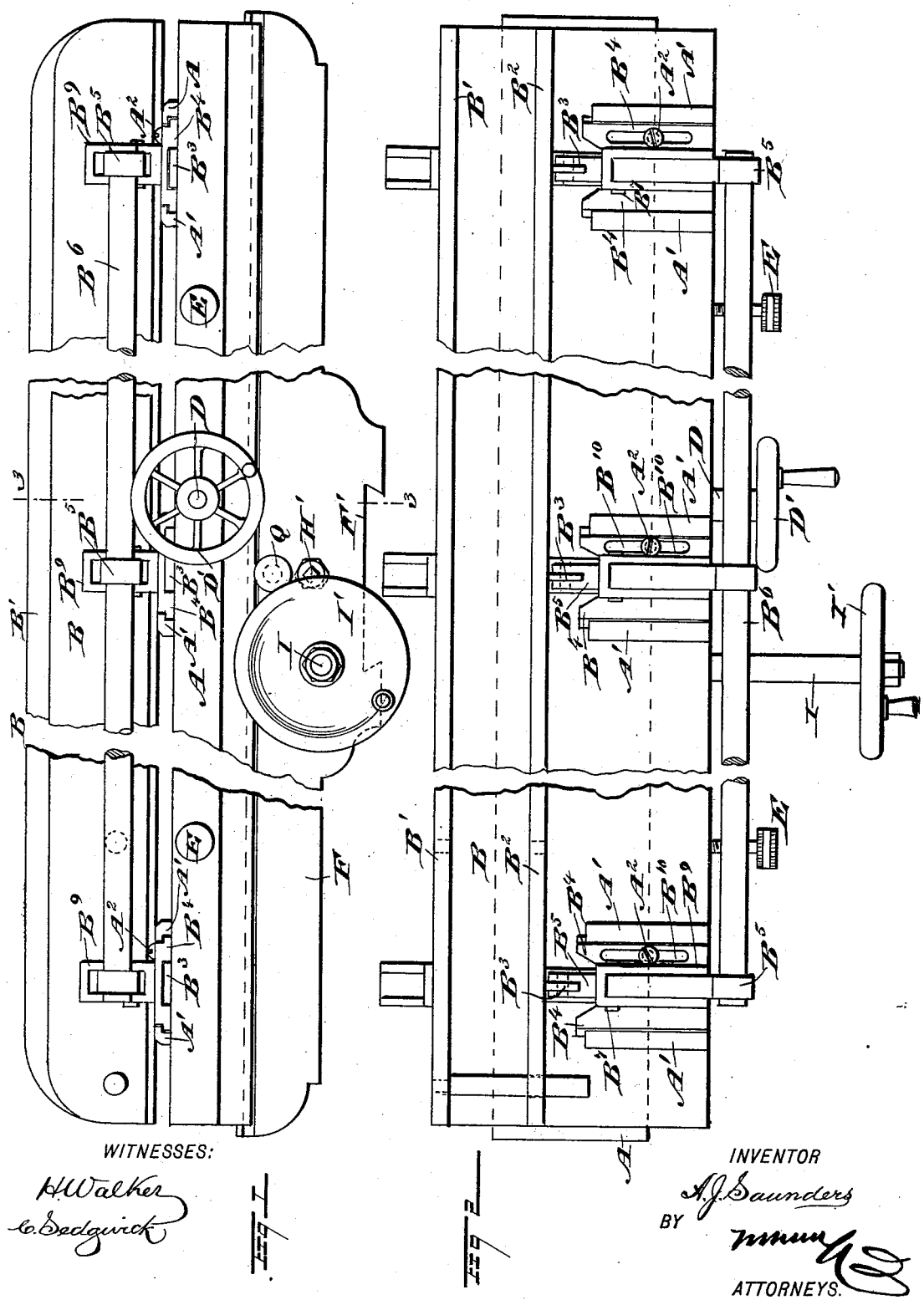

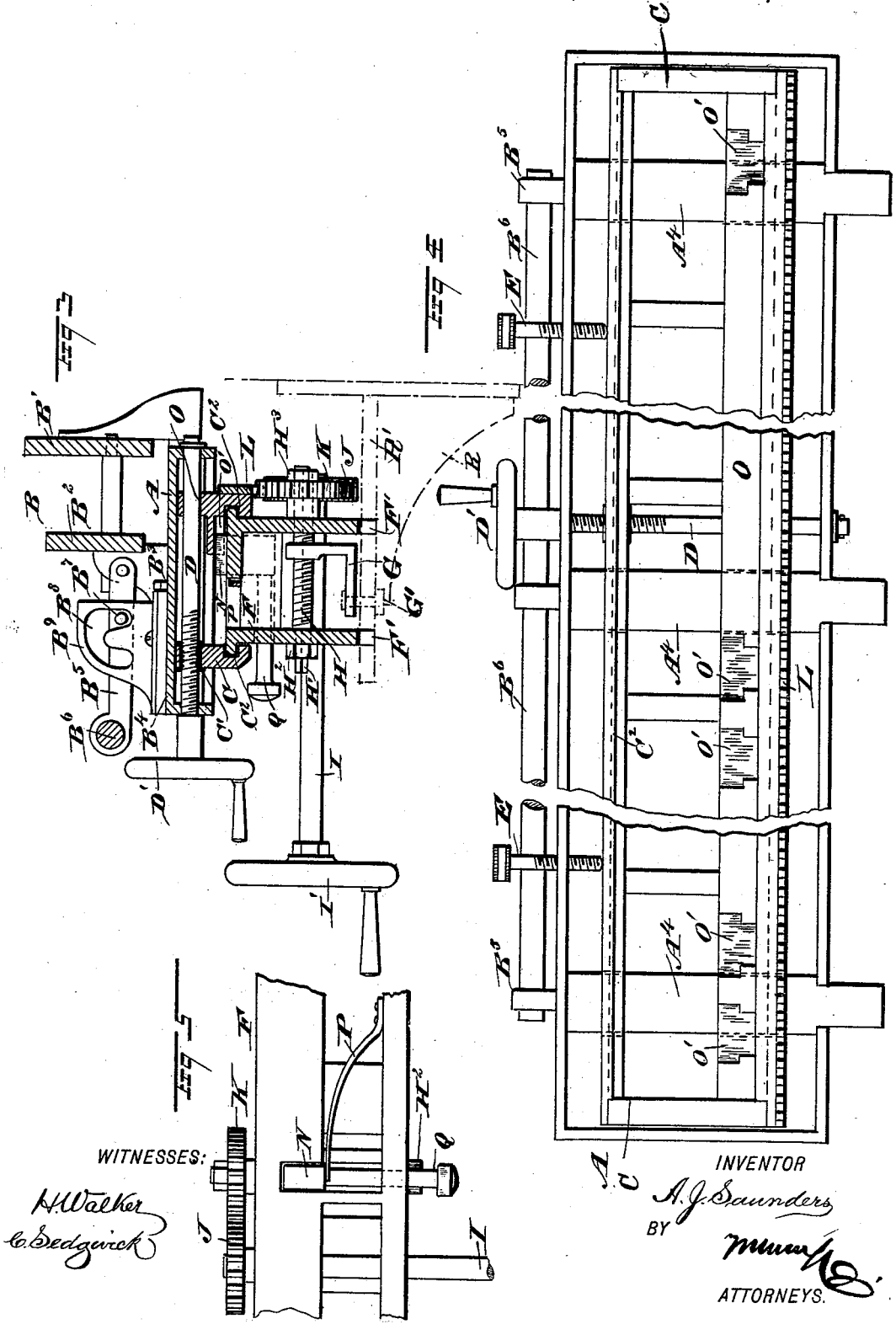

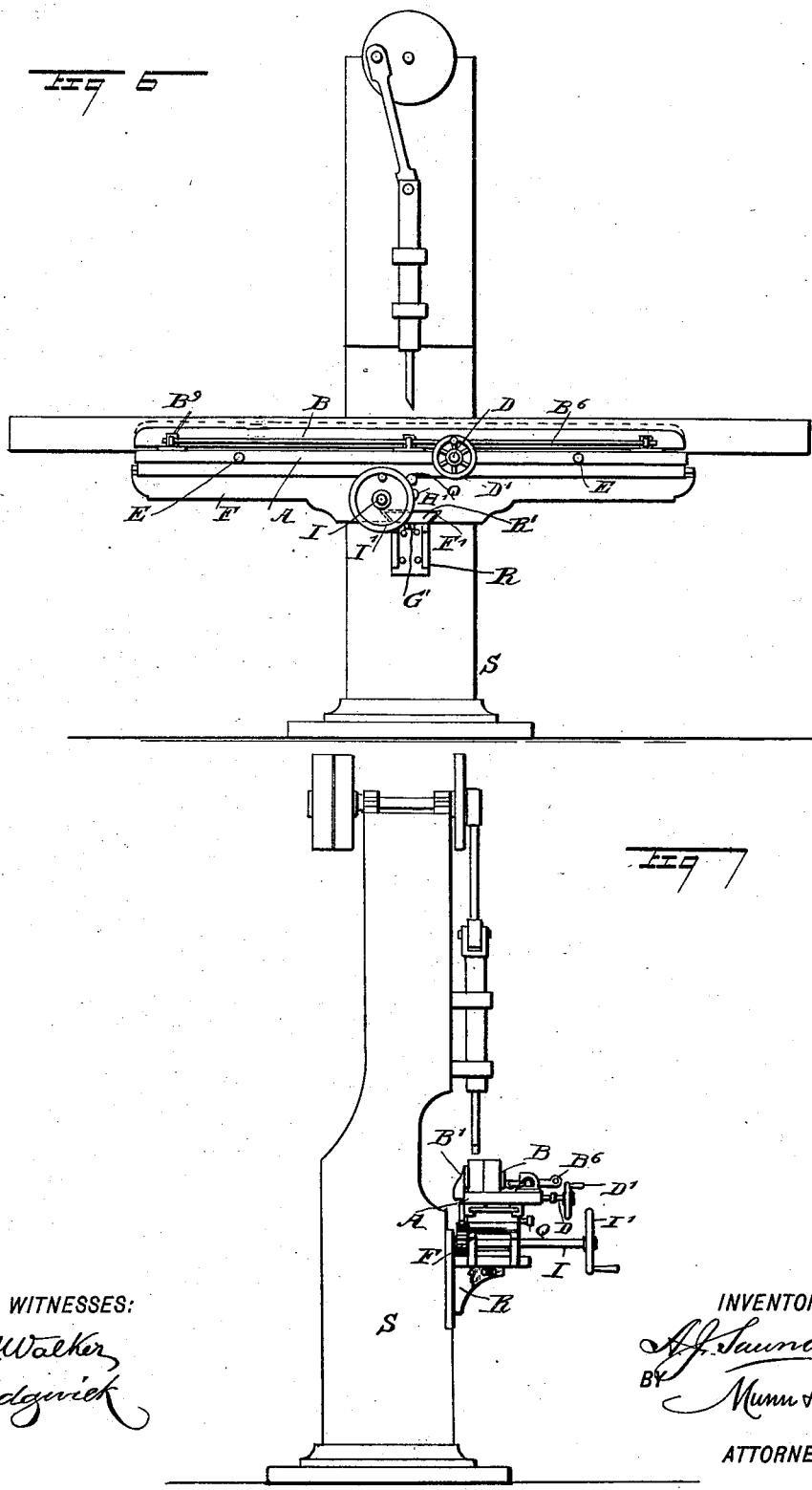

ALFRED JONES SAUNDERS, OF PORT ARTHUR, CANADA.

BED FOR MORTISING-MACHINES.

SPECIFICATION forming part of Letters Patent No. 506,945, dated October 17, 1893.

Application filed June 14, 1892. Serial No. 436,657. (No model.)

*To all whom it may concern:*

Be it known that I, ALFRED JONES SAUNDERS, of Port Arthur, Province of Ontario, Dominion of Canada, have invented a new and Improved Bed for Mortising-Machines, of which the following is a full, clear, and exact description.

The object of the invention is to provide a new and improved bed for mortising machines which is simple and durable in construction, very effective in operation and arranged for convenient adjustment to various sized stiles.

The invention consists of certain parts and details and combinations of the same, as will be described hereinafter and then pointed out in the claims.

Reference is to be had to the accompanying drawings forming a part of this specification, in which similar letters of reference indicate corresponding parts in all the figures.

Figure 1 is a side elevation of the improvement. Fig. 2 is a plan view of the same. Fig. 3 is a transverse section of the same on the line 3—3 of Fig. 1. Fig. 4 is an inverted plan view of the same with the carriage removed. Fig. 5 is a plan view of part of the carriage, showing the locking device for the same. Fig. 6 is a reduced side elevation of the improvement as applied on the mortising machine;
and Fig. 7 is an end elevation of the same.

The improved bed for mortising machines comprises in its general construction, a stile carrying table or holder A on which the stile is fastened by a clamp B, the said table having a transverse sliding motion on the carriage C mounted to slide longitudinally on the bed frame F formed in its under side at or near the middle thereof, with a dovetail groove F′ engaging a correspondingly-shaped tongue R′ on a bracket R attached to and forming part of the mortising machine S, as shown in Figs. 3, 6 and 7.

The bed frame F is locked in place on the tongue R′ by an L-shaped arm G supporting a bolt G′ shown in dotted lines in Fig. 3, and passing through an aperture in the tongue R′, the lower end of the bolt G′ carrying a wing nut which, when screwed up clamps the arm G and consequently the bed frame F in place on the bracket R. The arm G screws on a screw rod H mounted to turn in suitable bearings in the sides of the bed frame F and one outer end of the said screw rod (see Fig. 3) is formed with a square offset H′ for conveniently applying a wrench or other tool so as to turn the said screw rod in its bearings to slightly shift the bed frame F laterally according to the shape of the stile under treatment.

The screw rod H is locked in place after the proper adjustment of the arm G has been obtained by the nuts $H^2$ and $H^3$ screwing on the ends of the said screw rod H. The clamp B for locking the stile in place on the table A, is provided with a fixed longitudinally-extending plate B′ adapted to engage one side of the stile, the other side of the latter being engaged by a movable plate $B^2$ provided with transversely-extending bars $B^3$ fitted to slide in suitable bearings $B^4$ held transversely-adjustable in guideways A′ secured on the top of the table A. On the bars $B^3$ are pivoted the arms $B^5$ extending outward, the several bars being rigidly connected with each other by a rod $B^6$ adapted to be taken hold of by the operator to move the plate $B^2$ toward the stile so as to clamp the latter between the plates B′ and $B^2$.

In order to lock the arms $B^5$ in place each of the said arms is provided with a pin $B^7$ adapted to engage an inverted U-shaped groove $B^8$ formed in the keeper $B^9$ secured to the bearing $B^4$; thus, when the operator lifts the rod $B^6$ the several pins $B^7$ pass into the upper or middle parts of the grooves $B^8$ of the respective keepers $B^9$ and then by shoving transversely on the said rod $B^6$, the plate $B^2$ is moved laterally for the purpose of clamping the stile into position, as above described, and then the rod $B^6$ is pressed downward, so as to pass the several pins into one side of the slot $B^8$ to permit the arms $B^5$ to assume a horizontal position, the pins $B^7$ bearing against a fixed lug formed in the keeper $B^9$ between the ends of the slot $B^8$; see Fig. 3. In order to adjust the bearings $B^4$ transversely, each of the same is provided at one side with a transverse slot $B^{10}$ engaged by a set screw $A^2$ screwing in the top of the table A.

On the under side of the table A are arranged transversely-extending dovetails $A^4$ fitted to slide transversely in corresponding dovetail grooves formed in the carriage C, the said table being caused to slide transversely on the carriage by means of a screw rod D mounted to turn in the sides of the table A and provided at one end with a hand wheel D' for conveniently turning the said screw rod D which with its threaded part, engages a nut C' formed in one side of the carriage C. Thus, when the hand wheel D' is turned, the screw rod D moves the stile carrying table A transversely to the proper position to bring the stile into the proper position relative to the tool of the mortising machine. The transverse motion of the table A is limited by means of suitable set screws E screwing in one side of the table A and adapted to abut against the front side of the carriage C.

In the under side of the carriage C are formed longitudinally-extending guideways $C^2$ (see Fig. 3) engaging the bed frame F to permit the carriage to slide longitudinally on the said bed frame. In order to move the carriage C longitudinally, a transversely-extending shaft I is provided carrying on one outer end a hand wheel I' for conveniently turning the said shaft to shift the carriage as hereinafter more fully described.

The rear end of the shaft I carries a gear wheel J in mesh with a second gear wheel K mounted to rotate loosely on the screw rod H between one side of the bed frame F and the nut $H^3$. This second gear wheel K is in mesh with a rack L extending longitudinally and attached to the rear side of the carriage C and thus, when the hand wheel I' is turned, a rotary motion is given to the gear wheel J which transmits its motion to the gear wheel K, and as the latter is in engagement with the stationary rack L the latter is shifted longitudinally and consequently a longitudinal sliding motion is given to the carriage C.

In the said bed frame F and near the middle of the same is arranged a pin N extending vertically and mounted to slide transversely, the projecting upper end of the said pin being adapted to engage one of a series of notches O' formed in the under side of the pattern O attached to the carriage C, as will be readily understood by reference to Figs. 3, 4 and 5.

The pin N is pressed on by a spring P so as to hold it in engagement with the corresponding notch O and the said pin is held on a rod Q fitted to slide transversely and provided at its outer end with a knob to enable the operator to pull the said rod to withdraw the pin N from the corresponding notch O' whenever it is desired to shift the stile-carrying carriage C to present a new place for the chisel and bits to work on. The several notches O' are arranged singly one for each mortise the notch being formed according to the size, style, and shape of the mortise to be formed in the style. It will be seen that the pattern O is thus formed with a number of notches O' corresponding to the mortises to be formed in the stile, the carriage being shifted after a hole has been formed by the cutting tool until the pin N drops in the next notch, after which a second hole is bored in the stile, and so on until all the notches are successively engaged by the pin N and corresponding holes are bored or formed in the stile to form the several mortises.

It will be distinctly understood that the main feature of my invention is the arrangement of the pattern O and the notches O' therein corresponding to the mortises to be formed in the stile by the cutting tool, the carriage carrying the stile being locked to the spring pressed pin N.

Having thus described my invention, what I claim as new, and desire to secure by Letters Patent, is—

1. In a mortising machine, the combination with a bed frame, of a carriage fitted to slide thereon, a pattern secured on the said carriage and formed with notches arranged according to the mortise to be formed in the stile, and a locking device held on the said bed frame and adapted to lock the said carriage to the bed frame, substantially as shown and described.

2. In a mortising machine, the combination with a bed frame, of a carriage fitted to slide longitudinally thereon, a stile carrying table fitted to slide transversely on the said carriage, a pattern held on the said carriage and provided with notches arranged according to the mortise to be formed in the stile, and a locking device held on the said bed frame and adapted to lock the said carriage to the bed frame, substantially as shown and described.

3. In a mortising machine, the combination with a transversely-adjustable bed frame, of a carriage fitted to slide longitudinally on the said bed frame, a stile carrying table held transversely adjustable on the said carriage, a pattern formed with notches arranged according to the mortises to be formed in the stile, and a spring pressed pin held in the said bed frame and adapted to engage the notches in the said pattern, substantially as shown and described.

4. In a mortising machine, the combination with a transversely-adjustable bed frame, of a carriage fitted to slide longitudinally on the said bed frame, a stile carrying table held transversely adjustable on the said carriage, a pattern formed with notches arranged according to the mortises to be formed in the stile, a spring pressed pin held in the said bed frame and adapted to engage the notches in the said pattern, and a rod projecting to the outside of the said bed frame and carrying the said pin to enable the operator to withdraw the said pin from the corresponding notch to move the carriage longitudinally on the said frame, substantially as shown and described.

ALFRED JONES SAUNDERS.

Witnesses:
A. M. WILEY,
A. RAPSEY.